March 3, 1953 L. J. ANDRES 2,630,323
RECORD CHANGING MECHANISM FOR AUTOMATIC PHONOGRAPHS
Filed Oct. 1, 1946 12 Sheets-Sheet 1

Inventor
Lloyd J. Andres
By Carl S. Lloyd Atty.

March 3, 1953  L. J. ANDRES  2,630,323
RECORD CHANGING MECHANISM FOR AUTOMATIC PHONOGRAPHS
Filed Oct. 1, 1946  12 Sheets-Sheet 2

Inventor
Lloyd J. Andres
By [signature] atty.

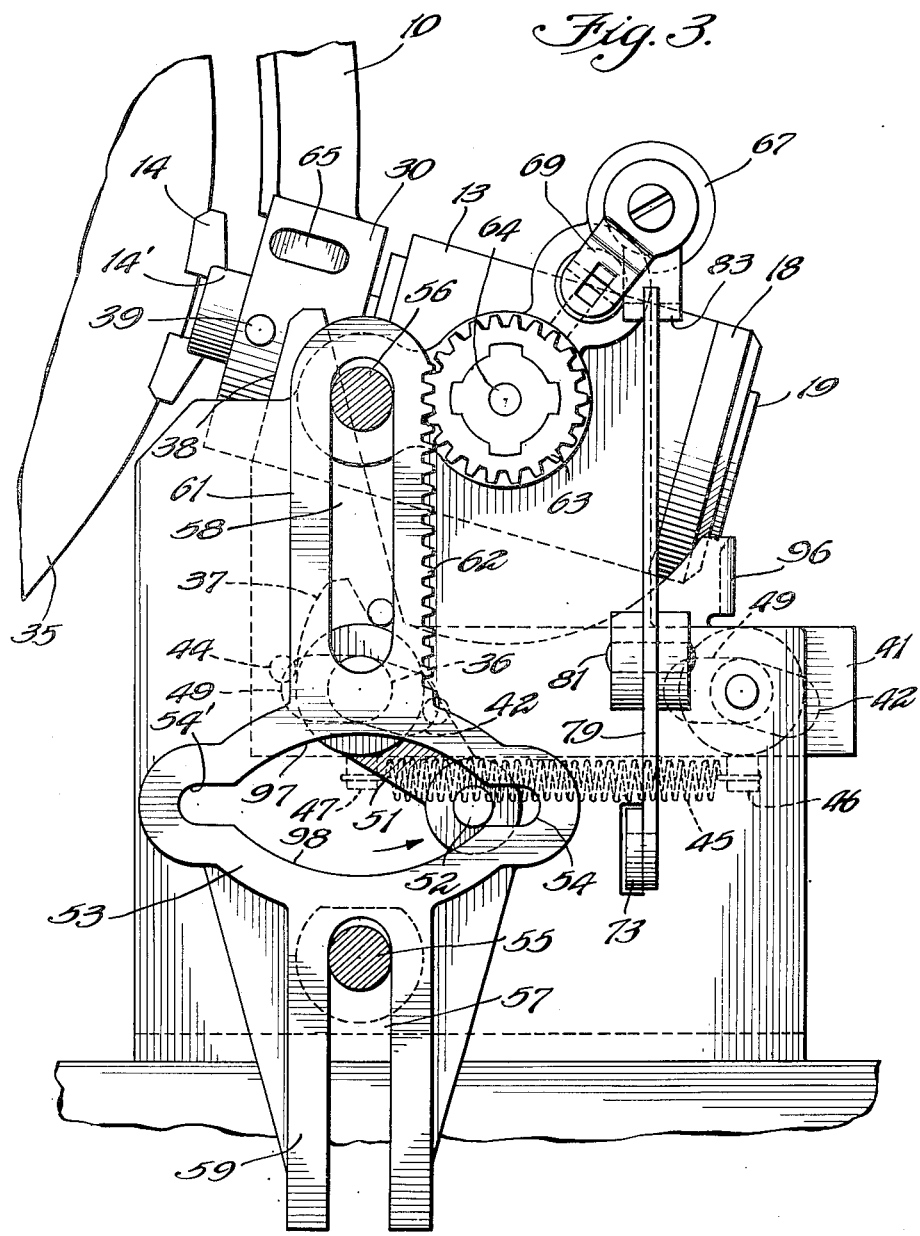

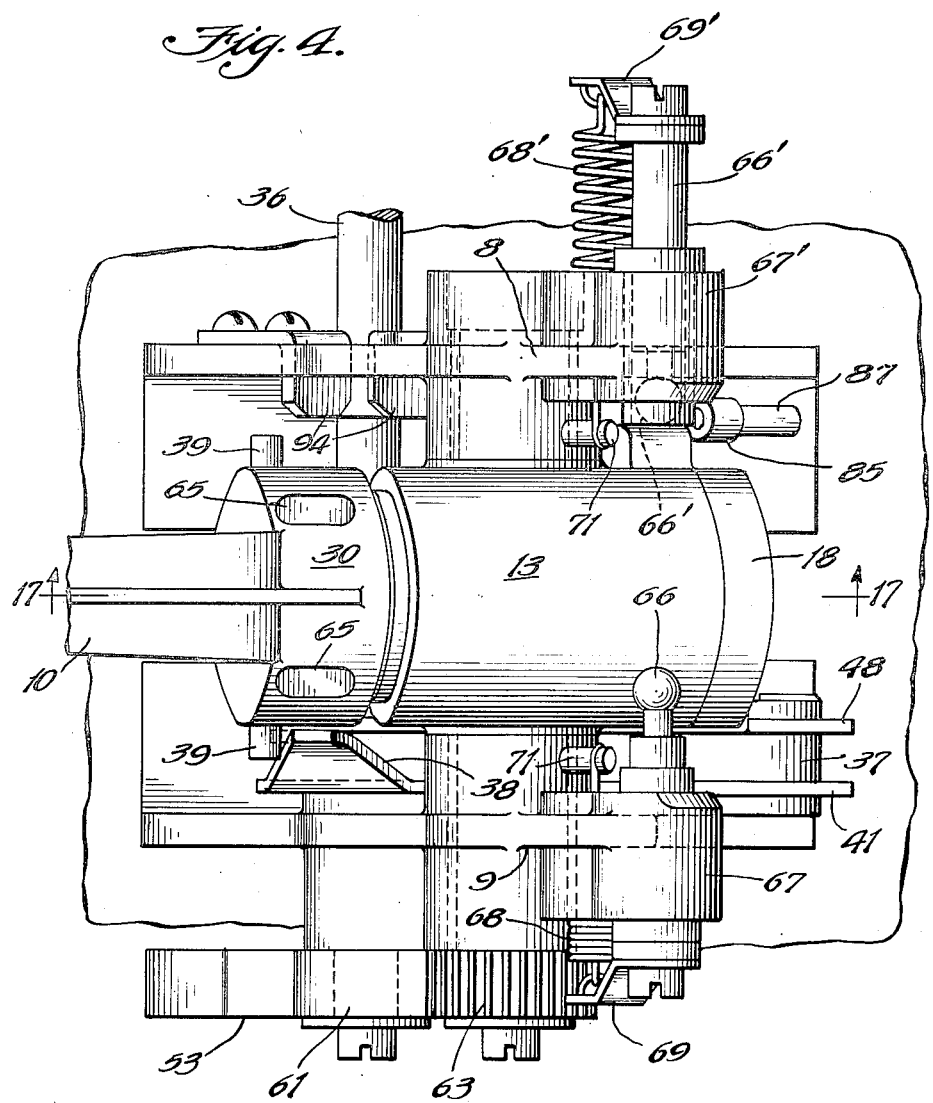

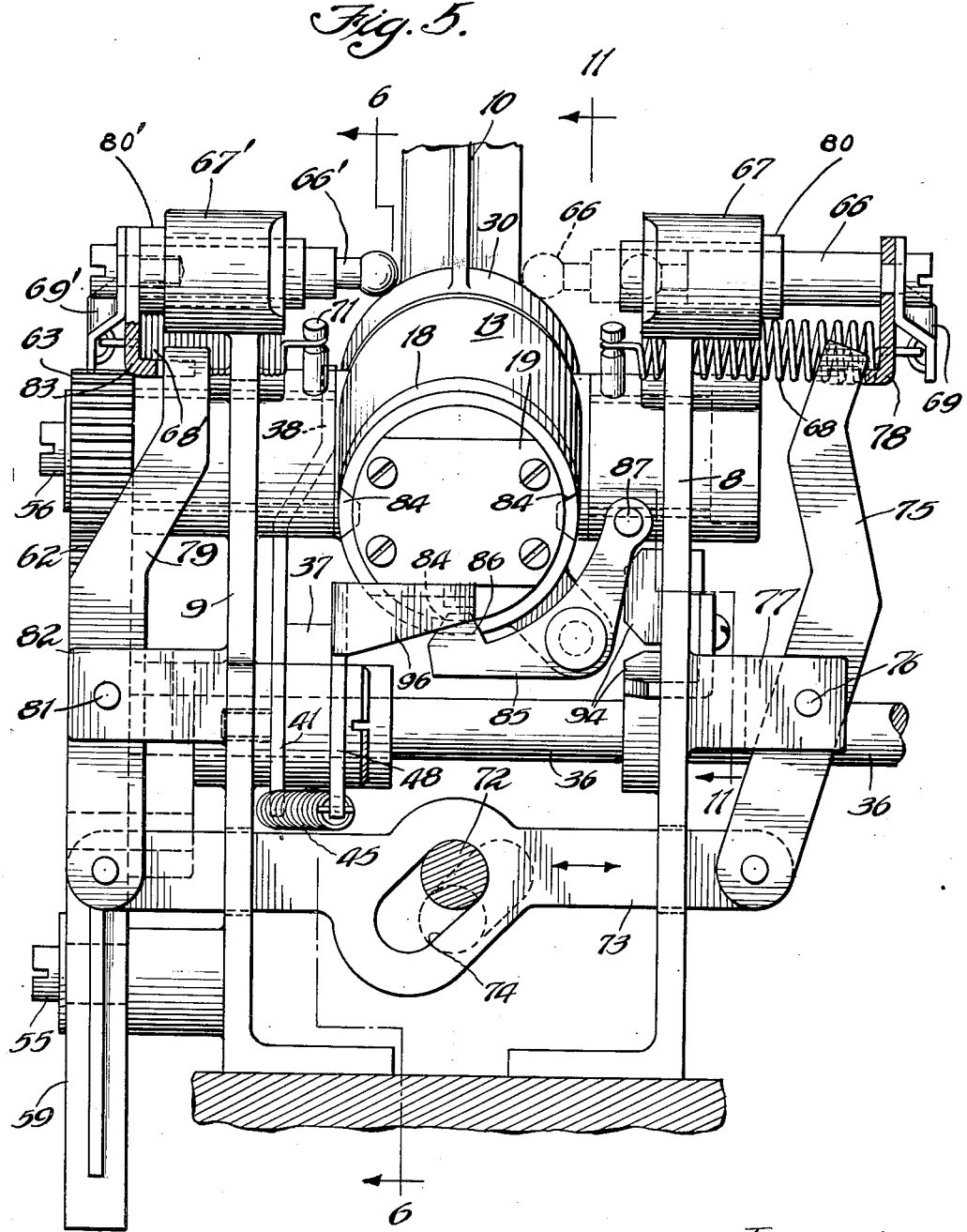

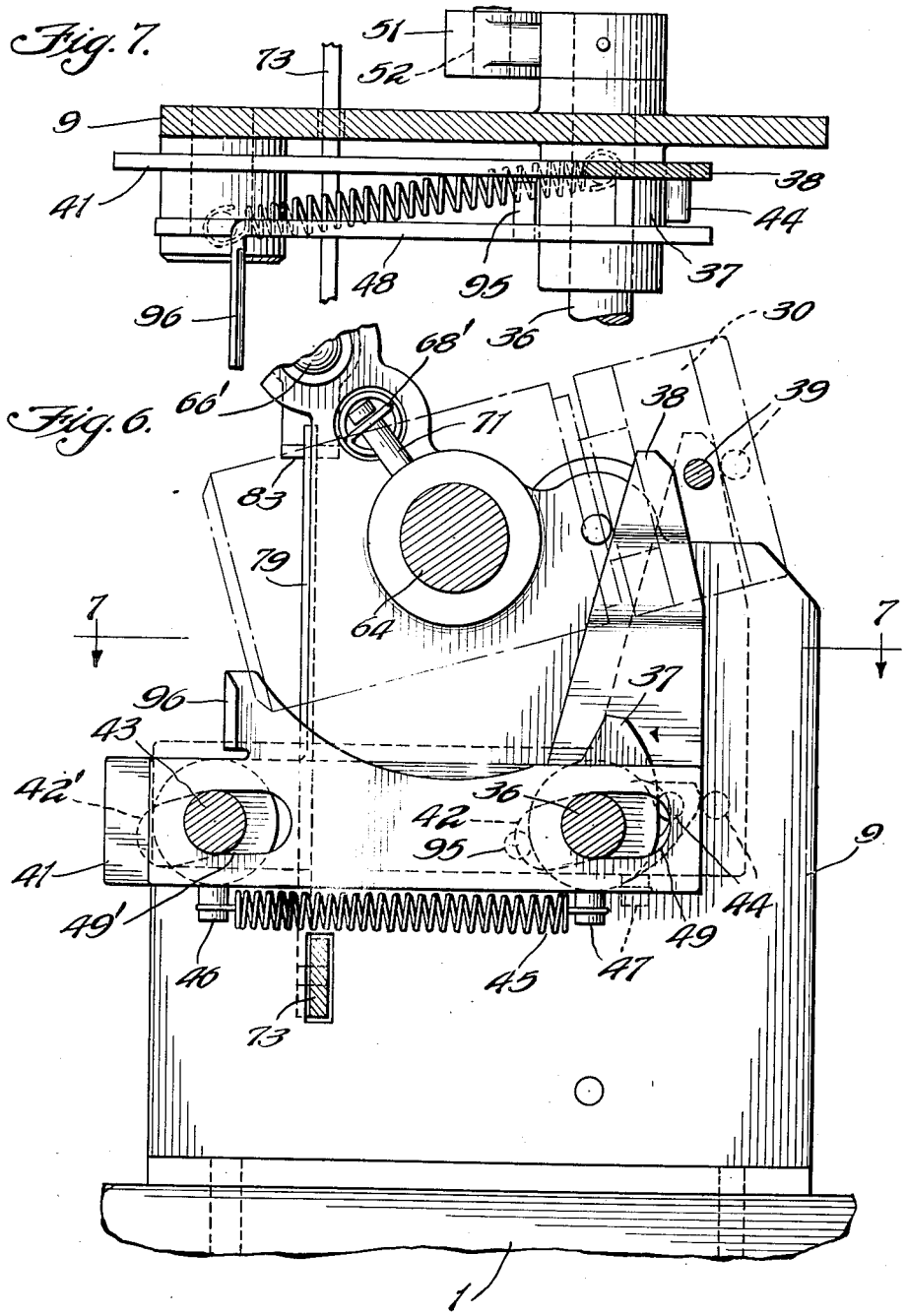

March 3, 1953 L. J. ANDRES 2,630,323
RECORD CHANGING MECHANISM FOR AUTOMATIC PHONOGRAPHS
Filed Oct. 1, 1946 12 Sheets-Sheet 7
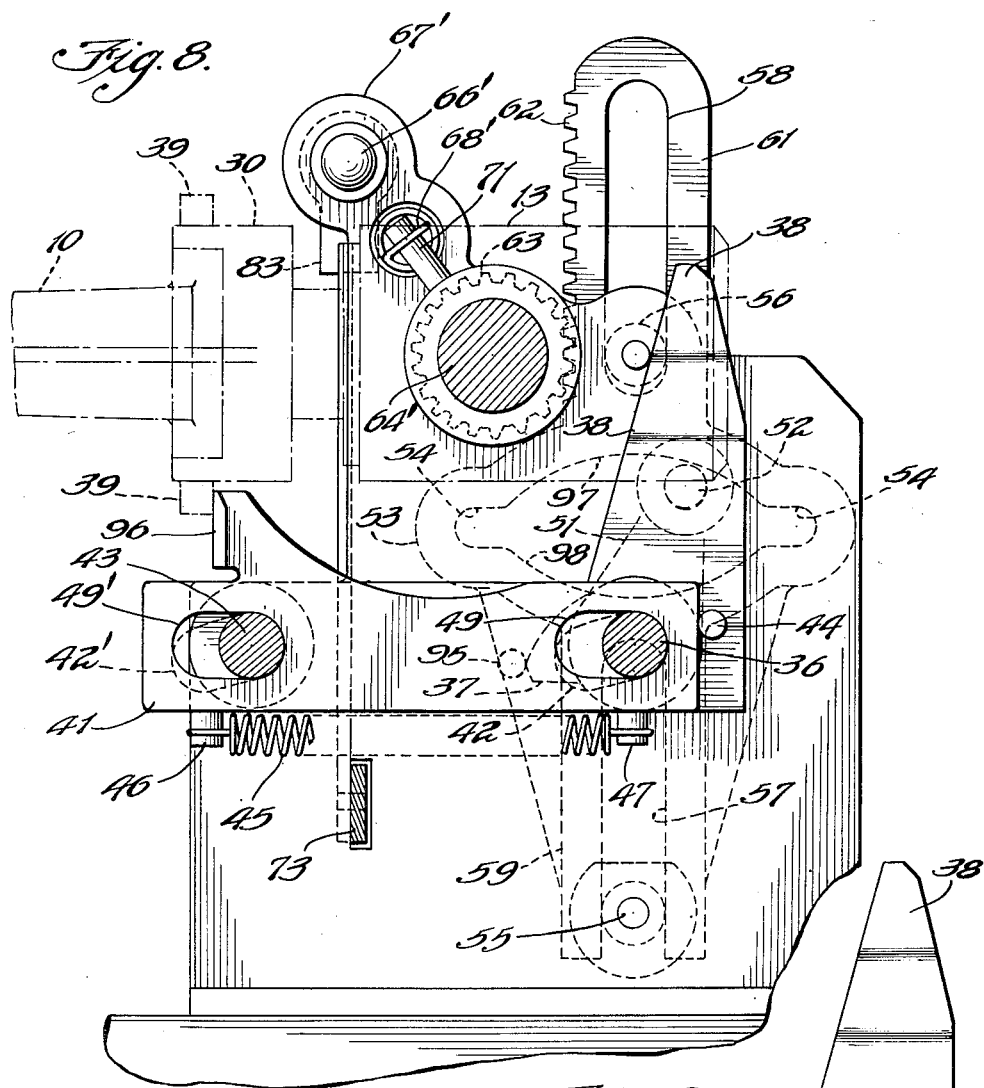
Inventor
Lloyd J. Andres
By [signature] atty.

March 3, 1953 L. J. ANDRES 2,630,323
RECORD CHANGING MECHANISM FOR AUTOMATIC PHONOGRAPHS
Filed Oct. 1, 1946 12 Sheets-Sheet 8
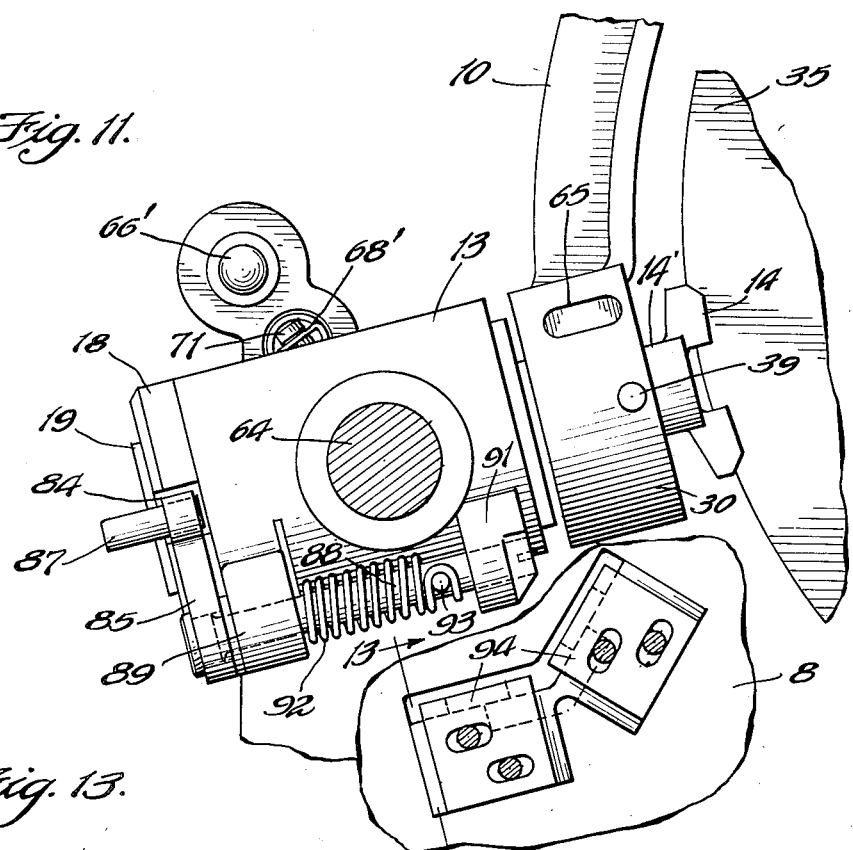
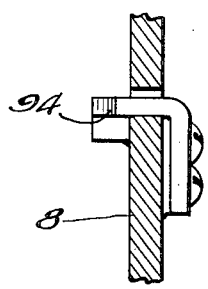
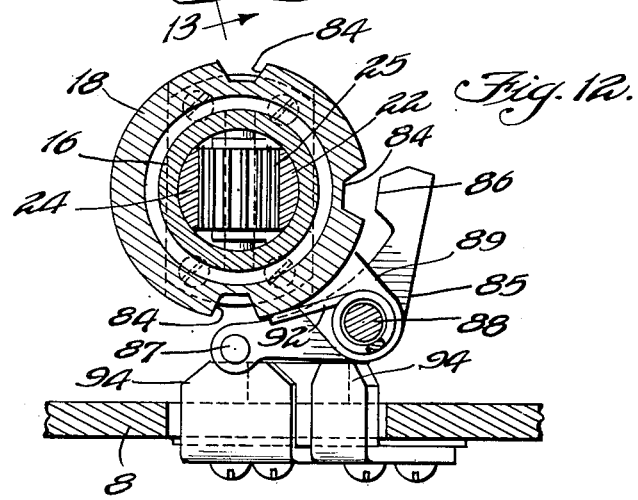
Inventor
Lloyd J. Andres
By Carl V. Lloyd
Atty.

March 3, 1953 — L. J. ANDRES — 2,630,323
RECORD CHANGING MECHANISM FOR AUTOMATIC PHONOGRAPHS
Filed Oct. 1, 1946 — 12 Sheets-Sheet 9
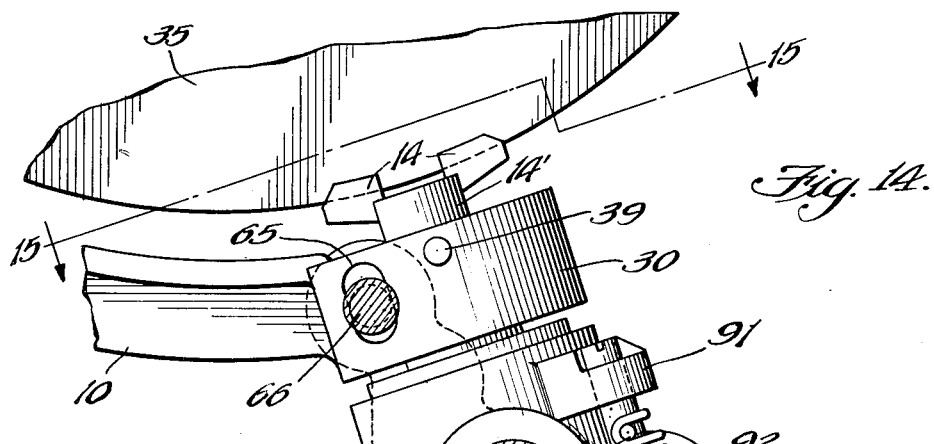
Fig. 14.
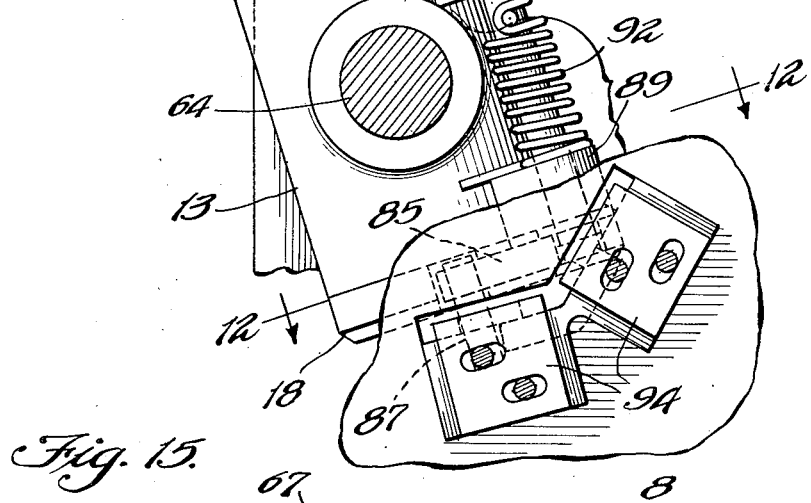
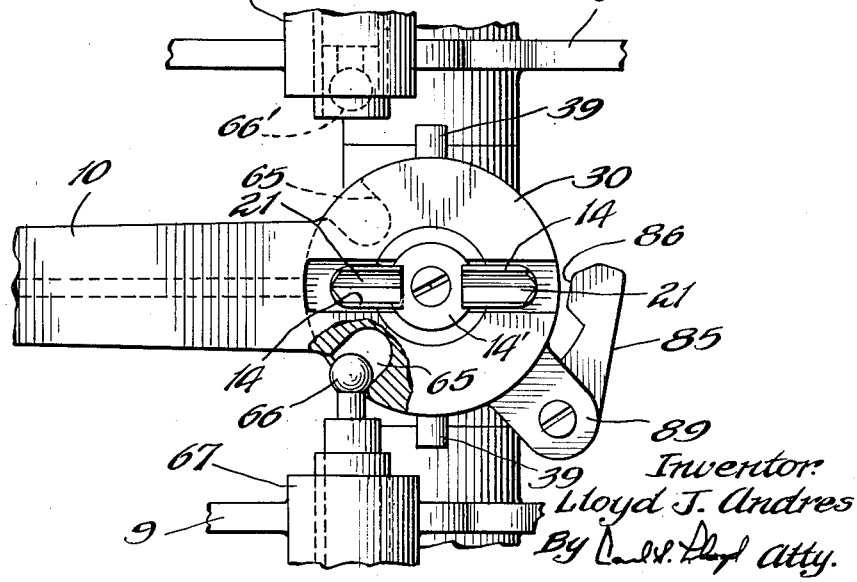
Fig. 15.
Inventor:
Lloyd J. Andres
By [signature] Atty.

March 3, 1953  L. J. ANDRES  2,630,323
RECORD CHANGING MECHANISM FOR AUTOMATIC PHONOGRAPHS
Filed Oct. 1, 1946  12 Sheets-Sheet 10
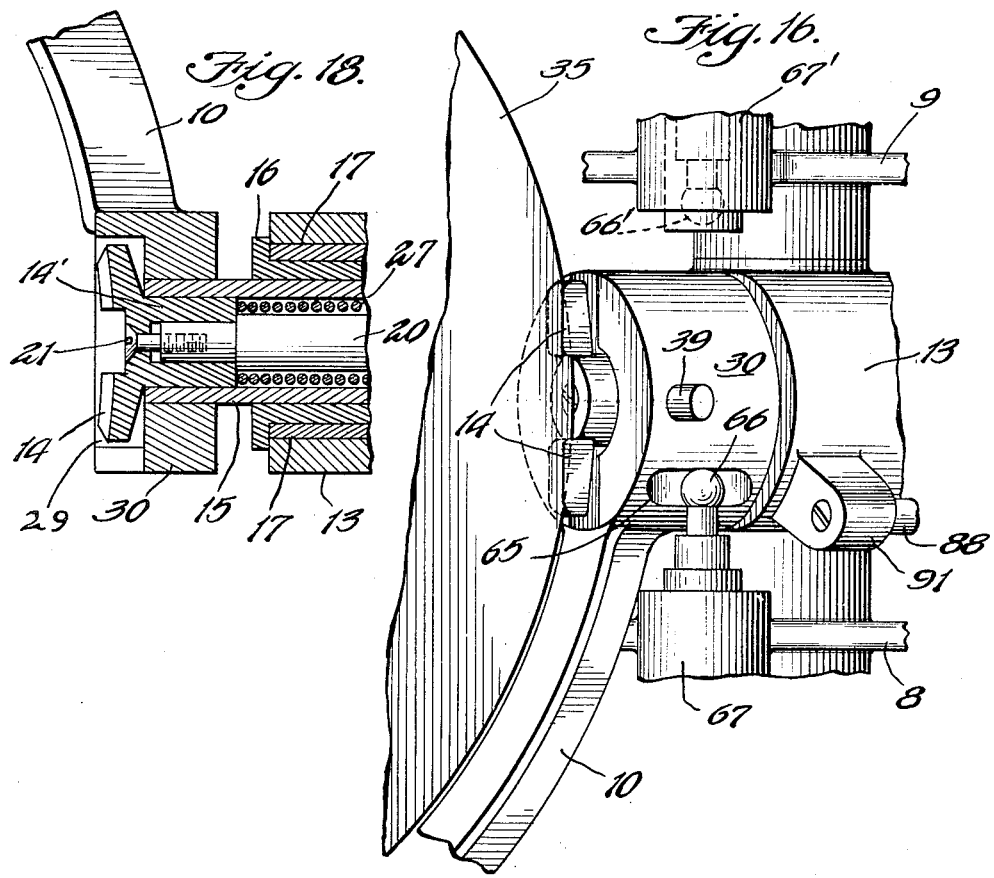
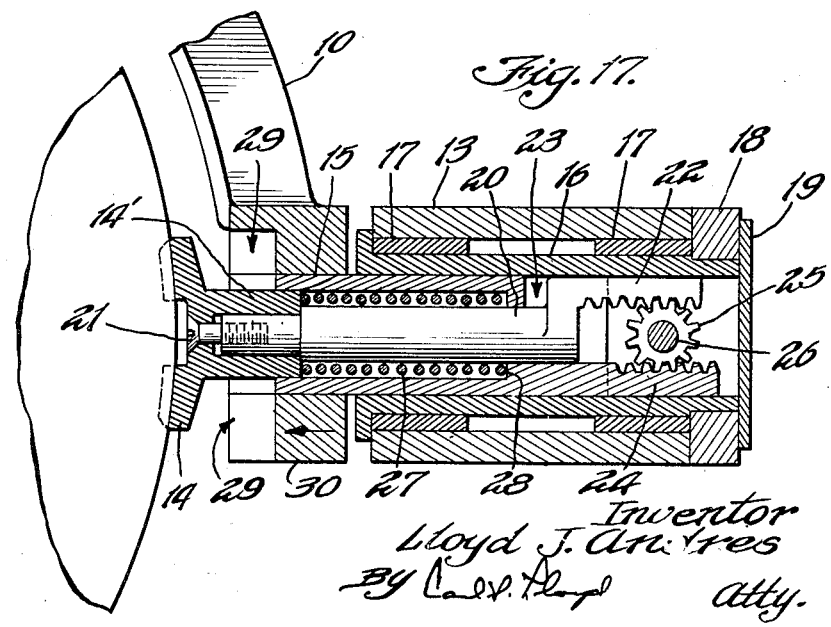

March 3, 1953 L. J. ANDRES 2,630,323
RECORD CHANGING MECHANISM FOR AUTOMATIC PHONOGRAPHS
Filed Oct. 1, 1946 12 Sheets-Sheet 11

Inventor
Lloyd J. Andres
By (signature) atty.

March 3, 1953 L. J. ANDRES 2,630,323
RECORD CHANGING MECHANISM FOR AUTOMATIC PHONOGRAPHS
Filed Oct. 1, 1946 12 Sheets-Sheet 12
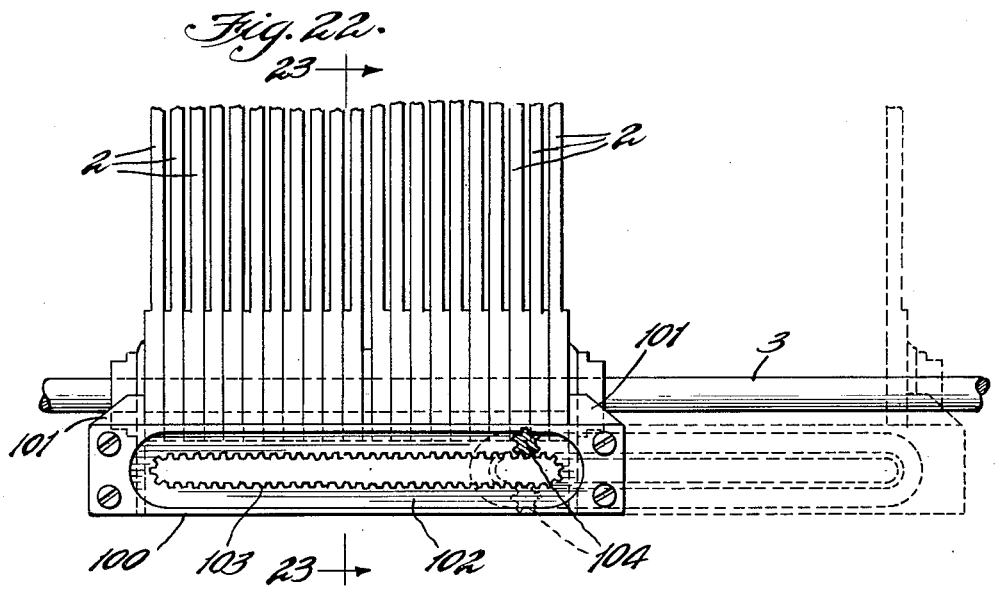
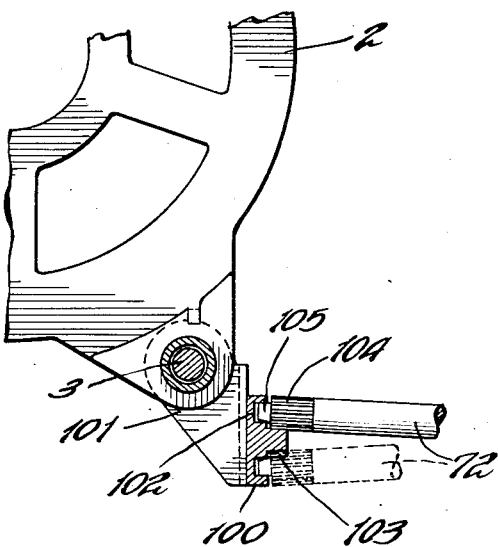
INVENTOR.
Lloyd J. Andres
BY
atty.

Patented Mar. 3, 1953

2,630,323

UNITED STATES PATENT OFFICE 2,630,323

RECORD CHANGING MECHANISM FOR AUTOMATIC PHONOGRAPHS

Lloyd J. Andres, Itasca, Ill., assignor, by mesne assignments, to H. C. Evans & Company, Chicago, Ill., a corporation of Illinois Application October 1, 1946, Serial No. 700,408

18 Claims. (Cl. 274—10)

This invention relates in general to selective record changers for automatic phonographs and more particularly to a new mechanism for transferring records from a record magazine to a turntable with a selected side uppermost for playing.

Prior record changers incorporating means for playing both sides of the records have employed complicated and troublesome mechanisms which often failed to accurately register the central hole in a disc record upon a central spindle of the turntable and which did not provide for rotating a record during its travel from a vertical position in a magazine to a horizontal position on a turntable in a positively guided manner. These difficulties are completely overcome in the present mechanism, which also has many other advantages to be hereinafter described.

The principal object of the invention is the provision of such a transfer means for removing a selected record from a laterally movable magazine and presenting the record to a horizontal turntable with a selected side positioned uppermost for playing.

Another object is to provide novel means for intermittently operating said transfer means and properly controlling the timing and velocity of record carrying elements.

A further object of the invention is the provision of improved mechanism whereby variable positions of the operating mechanism for moving the laterally movable magazine determine the side of the record to be played.

Another object is the provision of a transfer means for engaging and disengaging a record from opposite edges, whereby the center of the record, regardless of its diameter, is moved in a predetermined constant path for engagement with a turntable spindle.

A further object is to provide means for clamping and unclamping a record in the transfer device which is operable independent of the transfer means.

A still further object of the invention is the provision of a combination cam and lock mechanism whereby the record transfer means is at all times locked when not positively engaged for turning a record from the vertical position in which it is disposed in the magazine to the horizontal position in which it is placed on the turntable for playing.

These and other objects and advantages of the invention will be apparent from the following description of an illustrative embodiment thereof and from the accompanying drawings, in which:

Fig. 3 is an enlarged elevational view of certain parts of the record transferring and turning mechanism shown in Fig. 1;

Fig. 4 is a plan view of the mechanism shown in Fig. 3, being an enlargement of the corresponding parts shown in Fig. 2;

Fig. 5 is an end view of the mechanism shown in Figs. 3 and 4;

Fig. 6 is a sectional and elevational view taken substantially on the section line 6—6 of Fig. 5;

Fig. 7 is a sectional and plan view taken substantially on the section line 7—7 of Fig. 6;

Fig. 8 is an elevational view of said mechanism taken from the side opposite that shown in Fig. 3 and with the parts in changed position;

Figs. 9 and 10 are detail side elevations of certain of the elements shown in Fig. 8;

Figs. 11 and 14 are fragmentary side elevations of said record transferring and turning mechanism taken substantially along line 11—11 in Fig. 5, the two views showing the parts in changed positions;

Fig. 12 is a cross-sectional view taken along section line 12—12 of Fig. 14;

Fig. 13 is a detail cross-sectional view taken along section line 13—13 of Fig. 11;

Fig. 15 is a view taken along line 15—15 of Fig. 14;

Fig. 16 is a plan view of the mechanism shown in Fig. 15 but with the parts in a different position;

Fig. 17 is a cross-sectional view taken along section line 17—17 of Fig. 4;

Fig. 18 is a fragmentary cross-sectional view of a portion of the mechanism shown in Fig. 17 with certain parts in changed position;

Fig. 22 is an elevational view of the record magazine, showing certain parts of the mechanism for shifting said magazine laterally when a record selection is made; and Fig. 23 is a fragmentary view of said magazine and shifting mechanism taken substantially on the section line 23—23 of Fig. 22.

Figure 1:
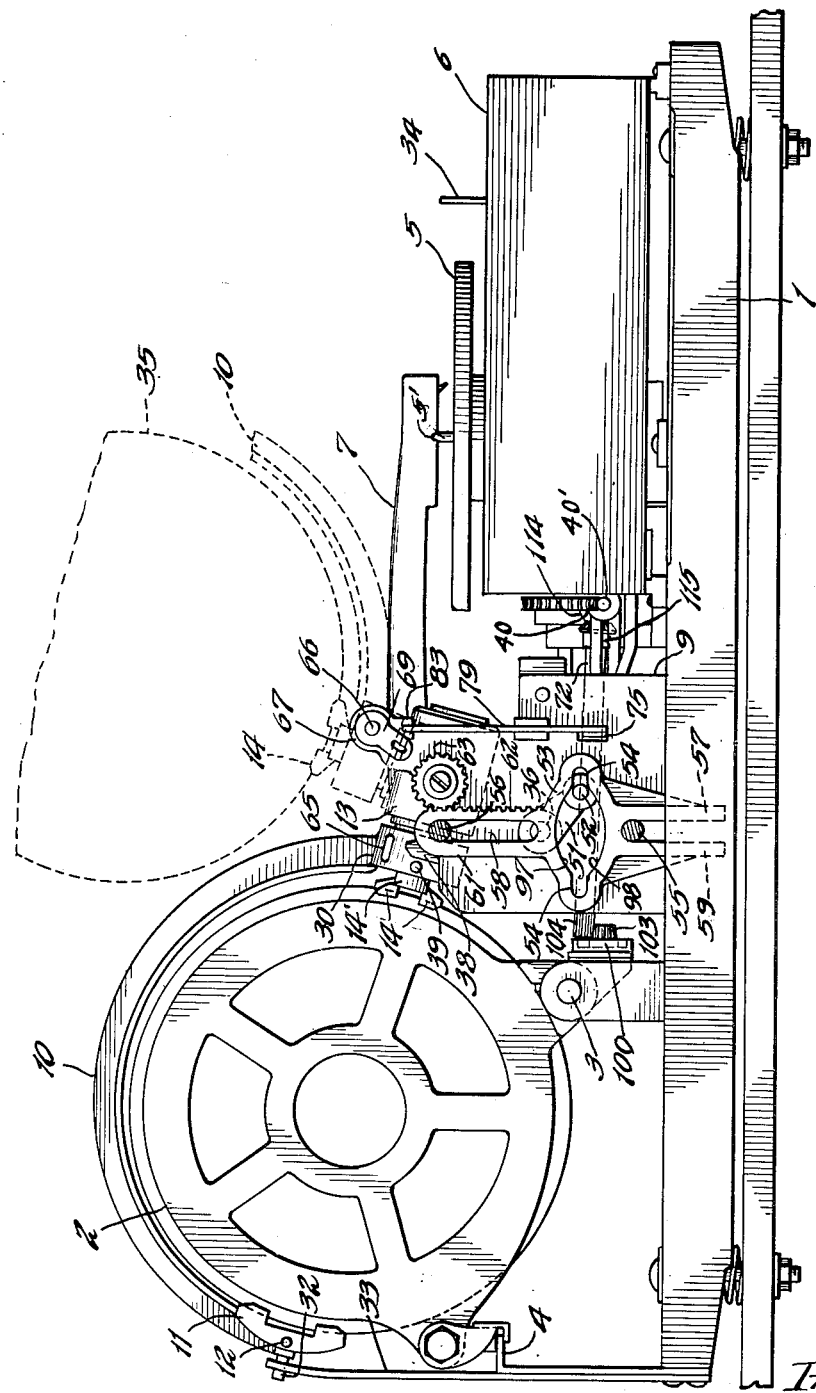
Fig. 1 is a side elevation of the record-changing mechanism.

The record changer mechanism of the invention is shown generally in Figs. 1 and 2 to which reference will first be made. As shown in these views, a base 1 serves as a support for all of the elements of said mechanism. A laterally movable magazine 2 is provided to support a plurality of disc phonograph records in parallel spaced relation. This magazine is movably supported on a shaft 3 and a plate 4, which latter members are secured rigidly to base 1. A turntable 5 is adapted for rotation in the usual manner by means not shown and has a record-locating pin 5' at the center thereof. A selector for initiating the operation of the mechanism herein described is positioned in a housing 6 and is not shown in detail since the present invention is concerned primarily with the means for transferring the record from the magazine to the turntable for playing with a preselected side uppermost. A reproducer arm 7, generally shown in Fig. 2, is adapted to be automatically controlled (by means not shown) to play the records when they are placed upon the turntable.

Figure 19:
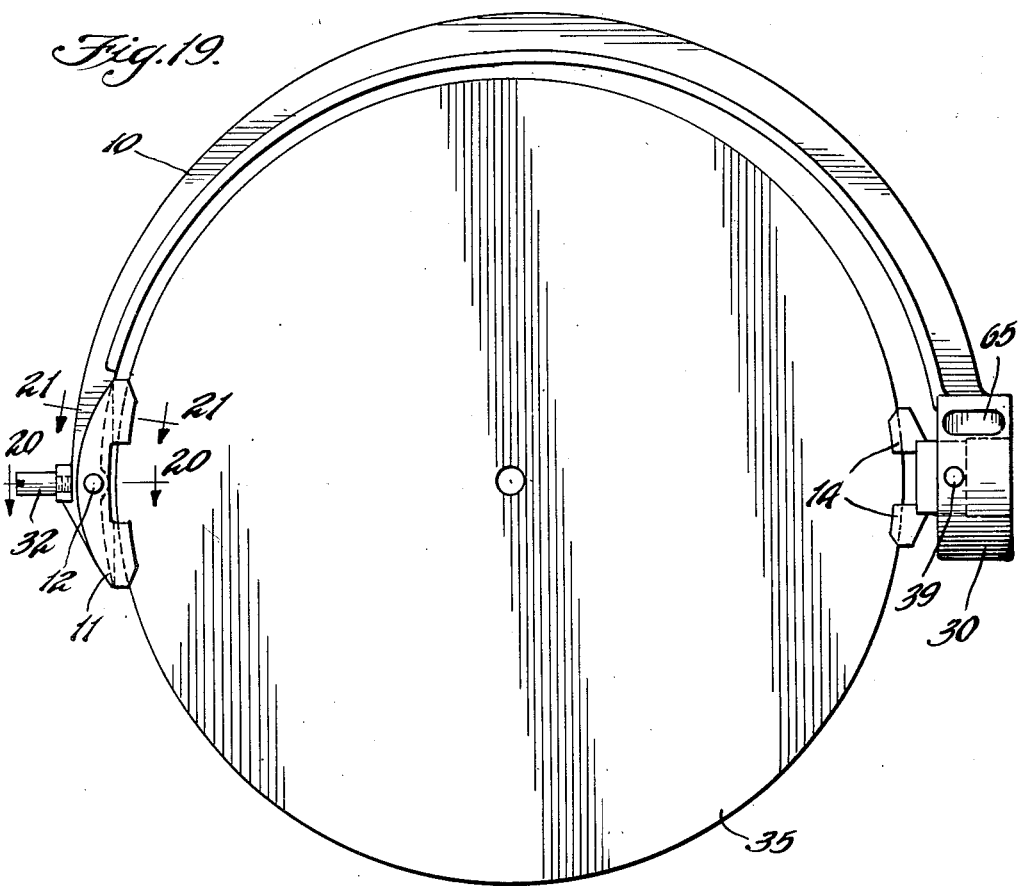
Fig. 19 is an enlarged plan view of the record clamping elements of the machine.
Figure 20:
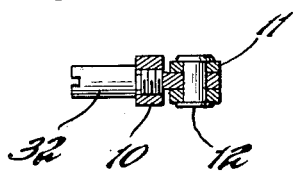
Fig. 20 is a detail cross-sectional view of one of the record gripping members, taken on the section line 20—20 of Fig. 19.

Stationary supports 8 and 9 (see Fig. 2), secured to the base 1, carry the record transfer mechanism, which, in part, comprises an arcuate record clamp member 10 having an outer jaw 11 pivotally mounted upon a pin 12 (see Fig. 19). The inner end of the record clamp member 10 is slidably supported in a trunnion or transfer head 13 which is journaled at opposite sides in the supports 8 and 9. An inner record clamp jaw 14 is positioned opposite the outer jaw 11 and is slidably retained in the bore of the record clamp 10 by mechanism to be hereinafter described.

As stated above, one object of the invention is to clamp a disc record at opposite edges without disturbing the record's center position and Figs. 17 and 18 illustrate the mechanism for accomplishing this result. As shown in these views, the inner end of the record clamp member 10 comprises a hub 30 which is rigidly secured to a sleeve 15. The latter is slidably fitted into a barrel 16 journaled for rotation in bushings 17 in the trunnion 13. A lock collar 18 and end plate 19 are concentrically secured to barrel 16. A plunger 20 is slidably fitted in the bore of the sleeve 15 and the inner jaw 14 is secured to one end of said plunger by a screw 21. An offset rack portion 22 of the plunger 20 is slidably fitted in a slot 23 in said sleeve 15. A projecting end 24 of the sleeve 15 contains rack teeth opposed to those in said offset rack portion 22. An idler pinion 25 journaled on a pin 26 secured in the barrel 16 engages the racks in projection 24 and offset 22. It will be evident that the members 15 and 16 might be interconnected by means other than the rack-and-pinion construction shown if desired, an example of such possible alternative means being a centrally pivoted link having its ends suitably connected with said members 15 and 16, respectively, so that movement of one thereof in one direction will cause movement of the other in the opposite direction. A compression coil spring 27 surrounds the plunger 20 and bears at opposite ends against the inner end of a projection 14' of the record clamp jaw 14 and a shoulder 28 formed in the sleeve 15, respectively. A cavity 29 in the hub portion 30 of the clamp member 10 provides clearance for movement of the jaw 14 when the latter is retracted to the position shown in Fig. 18.

It will now be apparent that when the hub 30 of the clamp member 10 is moved in the direction shown by the arrow in Fig. 17 (by means to be later described), the outer and inner jaws 11 and 14 will move equally in opposite directions since such movement will carry the jaw 11 away from the record and, through the rack 24 in the sleeve 15, will cause rotation of the pinion 25 which in turn, through the rack 22, will retract the plunger 20 and the jaw 14 against the force of the spring 27. The inner jaw 14 will thus be retracted into the cavity 29 and the outer jaw will move in an opposite direction sufficiently to permit the magazine 2, carrying a repertoire of records, to freely pass the edges of the jaws 11 and 14.

When the hub 30 is caused to move in a direction opposite to that indicated by the arrow in Fig. 17 (in manner to be later described), the jaws 11 and 14, by reverse action, will be moved toward each other and a record will be clamped at its opposite edges therebetween without disturbing the center position of the record. The jaws 11 and 14 are positively held in fixed relation to the trunnion 13 at all times during the transfer cycles of the record to and from the turntable. This equal movement of the two jaws with reference to the trunnion 13 and their constant fixed relation to said trunnion is of great importance since it makes possible the accurate handling of records of different diameters which may be present in the magazine 2 and insures the coaxial placement of the record on the turntable.

Figure 21:
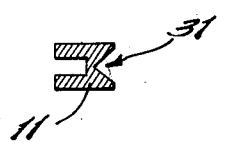
Fig. 21 is a similar view taken on the section line 21—21 of Fig. 19.

The jaw members 11 and 14 each have V grooves 31 in end portions thereof (see Figs. 19, 21 and 15) so that each engages the record at two points of contact, and said jaws are of such form and have such range of movement as to enable them to grip records of the smallest diameter which it would be desired to use in the machine.

Figure 2:
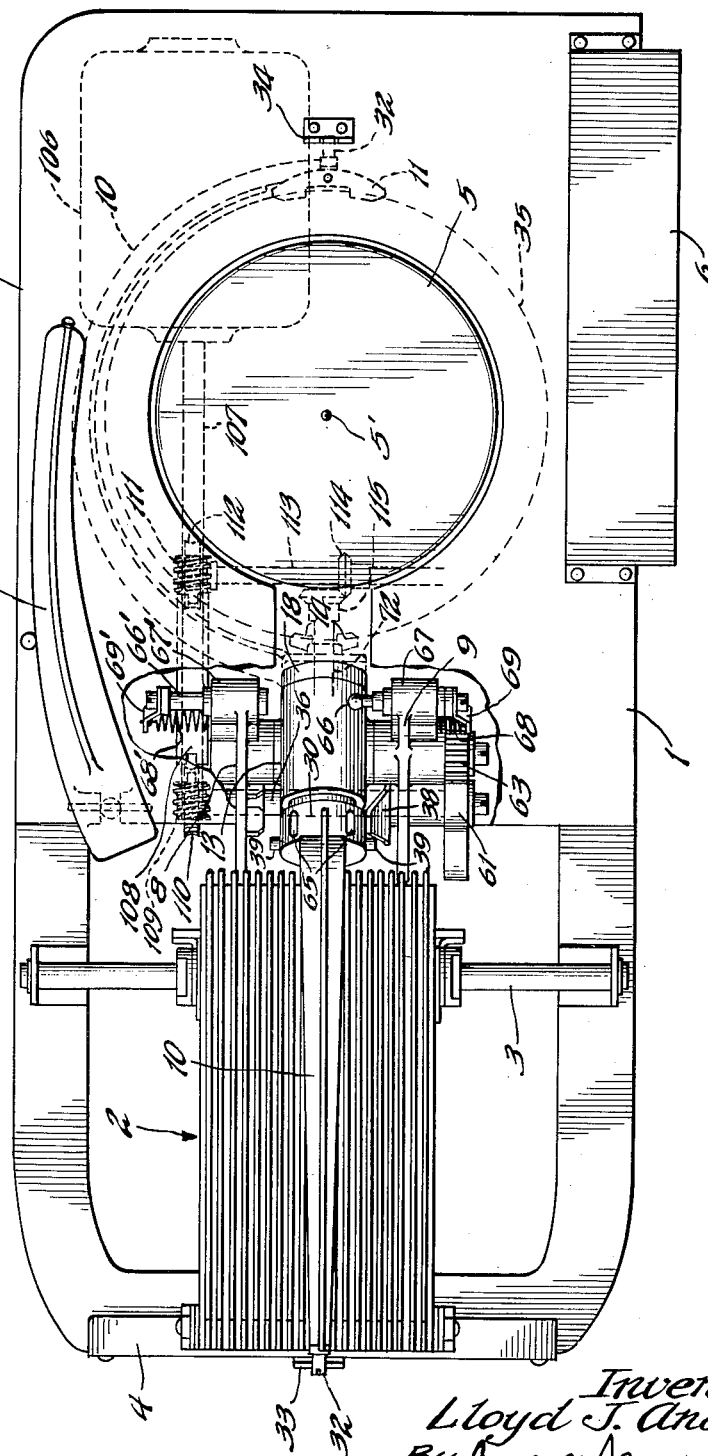
Fig. 2 is a plan view of the mechanism shown in Fig. 1.

A locating pin 32 is provided on the exterior of the outer end of the clamp member or transfer arm 10 and is adapted to enter a V groove in the top of a bracket 33 when the member 10 is disposed above the magazine and to enter a similar groove in a bracket 34 when said member is disposed above the turntable, as shown in Figs. 1 and 2.

The transfer of the records, one of which is indicated in the drawings by the numeral 35, is accomplished by pivotal movement of the trunnion or transfer head 13 and the mechanism for operating this element will now be described. See Figs. 3 and 4 for example. Said mechanism is operated from a cross shaft 36 which is intermittently driven by a motor 106 diagrammatically shown in Fig. 2. A motor shaft 107, clutch 108, worm 109 and worm gear 110 which may be mounted upon or geared to, said shaft 36, provide the driving connection. The clutch 108 may be controlled by mechanism such as is disclosed in my application Serial No. 639,945 filed August 12, 1946, now Patent No. 2,532,266, and said drive shaft may be connected with the selector mechanism 6 by a shaft 113 carrying at one end a worm wheel 112, meshing with a worm 111 on said shaft 107, and at the other end a worm 40' meshing with a worm wheel 40 carried on a drum shaft (not shown) of the selector mechanism 6.

When a record has been selected and is to be transferred from the magazine 2 to the turntable 5 said shaft 36 will be rotated by the worm 109 and worm wheel 110. A cam 37 secured to said shaft (see Figs. 3 and 6–8) will be thereby rotated to control the action of a lever 38 which bears against a pin 39 on the hub 30 of the transfer arm 10 when the jaws 11 and 14 are in the retracted position. Said lever 38 is carried on a slide 41 (see Figs. 6–9) which is slotted as indicated at 42, 42′ and is mounted on the shaft 36 and a pin 43 for endwise sliding movement. Said lever 38 has a pin 44 thereon riding on the cam 37 and is urged in direction away from the pin 39 on the hub 30 by a spring 45 extending between a pin 46 on said slide 41 and a pin 47 on a companion slide 48 (the function of which will be later described) which is also mounted on the shaft 36 and pin 43 for sliding movement within the limits determined by slots 49, 49′ therein. Said spring 45 thus tends to move said slides 41 and 48 in opposite directions.

When the lever 38 moves sufficiently to relieve its pressure from said pin 39, the spring 27 (see Figs. 17 and 18) will move the jaw 14 outwardly and the hub 30 inwardly in the manner hereinabove described. This will cause the jaws 11 and 14 to grip the selected record, which is then ready for transfer to the turntable.

Such transfer is accomplished by means of a crank 51 affixed to the shaft 36. (See Fig. 3.) Said crank carries a pin 52 at its outer end engaging the interior face of a cam 53 which is of generally elliptical shape but has horizontal recesses 54, 54′ at the ends thereof. At the time the record is ready for transfer the pin 52 is entering the right hand recess 54 as shown in Fig. 3. Further rotation of the shaft 36 and crank 51 will cause the cam member 53 to be bodily moved upwardly which is permitted by its mounting on fixed pins 55 and 56 on the support 9, said pins being disposed within slots 57 and 58 in lower and upper extensions 59 and 61, respectively, of said cam member 53. The upper extension 61 has a rack 62 on one side face thereof meshing with a pinion 63 on one of two stub shafts 64, 64′ by which the trunnion or transfer head 13 is journaled in the supports 8 and 9. Upward movement of said rack will therefore rotate the pinion 63 and said shaft 64 and cause the transfer head to be rotated in clockwise direction (viewing Figs. 1 and 3).

The record, as it is moved from the magazine 2, is in vertical position and of course it must be turned to a horizontal position to be placed on the turntable 2. To accomplish such turning the hub 30 of the clamp member 10 is provided with recesses 65, one on each side of the arcuate portion of said member, and spherically headed turning pins 66, 66′ (see Figs. 4 and 14 to 16) are provided adjacent the path of movement of the transfer head 13 and hub 30 so that one thereof will be in position to enter one of the recesses 65 as the transfer head and hub start to move downwardly to place the record on the turntable. The pins 66, 66′ are mounted in fixed hubs 67, 67′ on the frame supports 8 and 9 and the spherical head of the pin which is in working position on any particular record transfer operation will have a camming action in the recess 65 in which it is engaged, turning the hub 30 a quarter turn and moving the record from vertical position to horizontal position in which it is laid on the turntable. (See Figs. 14-16.)

The pins 66 are slidably mounted in the hubs 67, 67′ and each thereof is urged toward a projected position by a spring 68, or 68′ secured at one end to a clip 69, or 69′ on the outer end of the pin 66 and at the other end to a pin 71 on the support 8 or 9 as the case may be. Only one of said pins 66, 66′ is in projected or operative position upon any given record transfer operation and the record is turned to one side or the other depending upon which of these pins is projected.

The determination of which pin is to be projected on a particular operation is made by the selector mechanism. When selections are made calling for the playing of recordings on one side of the records a longitudinal shaft 72 will be brought to a raised position as shown in Figs. 1 and 5 (by mechanism to be later described) and will shift a cam bar 73 having a diagonal slot 74 therein to the left to the position shown in said Fig. 5. A lever 75 secured to the right hand end of the bar 73 and pivoted at 76 to a bracket 77 on the frame will then act upon a slotted angle piece 78 fixed to the right hand pin 66 (viewing Fig. 5) to move said pin against the tension of its spring 68 to the retracted position shown in full lines in said Fig. 5. At the same time a lever 79 pivotally secured to the other end of the bar 73 and pivoted at 81 to a frame bracket 82 will also be moved toward the right (viewing Fig. 5) and will remove its pressure from a slotted angle piece 83 on the other pin 66′ permitting its spring 68′ to move it to the projected or operative position shown in said Fig. 5.

When selections are made calling for the playing of recordings on the other side of the records, the shaft 72 will be moved downwardly and will shift the bar 73 to the right (viewing Fig. 5) thus permitting projection of the right hand pin 66 to the operative position (shown in dotted lines in Fig. 5) and withdrawing the left hand pin, with the result that the record will be placed on the turntable with the opposite side uppermost for playing.

It will be noted that the angle pieces 78 and 83 engage the ends of bushings 80, 80′, respectively in the hubs 67, 67′ thus providing a fixed stop for the projected pin when it is moved to operative position by its spring 68, or 68′ thereby insuring accurate and uniform positioning of the projected pin upon each operation. The fact that the pins are permitted to be projected by the springs 68, 68′ instead of being projected by mechanism acting positively thereon is a definite advantage in accomplishing this important result since it avoids any variation in position of the pin which might be caused by lost motion resulting from wear or improper adjustment of the parts of such mechanism.

During the turning of the transfer head 13 on the axis 64, 64′ the hub 30 of the clamp member 10 is positively locked against rotation except during the time that it is being turned to move the record from vertical to horizontal position, as above described, or from the horizontal to the vertical position. The locking mechanism provided for this purpose is best shown in Figs. 5, 11 and 12, to which attention is now directed.

The lock collar 18 above mentioned, which is interlocked with the hub 30 of the record clamp member 10 by means of the sleeve 15 and the barrel 16 (see Fig. 17), has a plurality of notches or recesses 84 therein, one for each of the three locked positions of said hub 30. A bell crank 85 having a locking projection 86 on one arm thereof and carrying a pin 87 in the other arm, is pivotally mounted on a rod 88 supported in ears 89 and 91 (see Figs. 11 and 14) on the exterior of the trunnion 13. A torsion spring 92, having one end secured to a pin 93 on said rod 88 and the other end bearing against the inside of the arm of the bell crank which carries the pin 87, tends to hold the projection 86 on the other arm of the bell crank in one of the notches or recesses 84 on the collar 18 when the latter is in any one of the positions of rest. As the transfer head 13 approaches either of its turning positions the pin 87 engages a part of an unlocking cam 94, which is adjustably secured to the frame member 8, and causes the bell crank to turn against the force of the torsion spring 92 to remove the locking projection 86 from the particular notch 84 in which it has been held by said spring. When the hub 30 and lock collar 18 have turned to their next position the pin 87 will have passed the part of the cam 94 which caused disengagement of the locking projection 86 on the bell crank from one of the notches 84 and the spring 92 will force said projection into the next succeeding notch which by that time will have been brought into position to receive said projection.

Thus the record-carrying elements will be positively locked against rotary movement at all times except when the hub 30 is being turned by camming action on one of the pins 66, 66' and even during this turning movement they are positively held in place and guided by the action of the pin 66 or 66' in one of the recesses 65 in said hub. Therefore they can at no time get out of control or follow an irregular course during the transfer action. Consequently there will be no difficulty in accurately placing a record on the turntable or in restoring it to the magazine. In this connection it will be observed that the wedge shape of the locking projection 86 and the notches 84 permits gradual disengagement of the projection from the notch in which it has been positioned as the pin 66 or 66' enters one of the cavities 65 and starts the rotation of the hub 30; and conversely the engagement of the projection 86 in one of the notches 84 as the pin 66 or 66' leaves one of the recesses 65 in said hub is gradual and progressive. The result is that prior to disengagement of the hub 30 by locking projection 86 the pin 66 or 66' has positively engaged said hub, and prior to disengagement of the hub by said pin it has been positively engaged by the locking projection, so that there is no instant when said hub is not in positive engagement with one or the other of said members.

The raising and lowering of the shaft 72, to determine which side of the record is to be played, is controlled by mechanism shown in Figs. 22 and 23 of the drawings. As seen in these views a plate 100 is attached to a bracket 101 on the magazine 2 and has a groove 102 in the outer face thereof. A mangle rack 103 is centrally positioned on said plate and meshes with a pinion 104 on the end of the shaft 72. A reduced end 105 of said shaft extends into said groove 102. The shaft 72 is connected by gears 114 and 115 with the shaft 113 (see Fig. 2) and when the latter is rotated the rack 103 is reciprocated to bring the magazine to a position determined by the selector mechanism. If to reach the selected record the magazine must be moved sufficiently to the left (viewing Fig. 22) to bring the mangle rack 103 slightly beyond the full line position shown in said Fig. 22 the pinion 104 will be moved by the teeth on the end of said rack downwardly from said full line position to the dotted line position shown in said Fig. 22 and Fig. 23, thereby lowering the end of shaft 72 from the full line position to the dotted line position shown in Fig. 23. If to reach the selected record pinion is required to traverse the opposite end of the rack 103 the shaft 72 will again be raised to the upper position. The dotted line position of the elements in Fig. 22 is that just prior to such upward movement of the pinion and shaft 72. An intermediate portion of said shaft 72 is mounted in a vertically movable bearing block (not shown) to permit this action.

It will thus be apparent that if the pinion 104 is on the upper side of the rack 103 when the selected record is reached the record will be turned to present one side uppermost for playing and if it is on the lower side of the rack when such record is reached the record will be turned oppositely to present the other side uppermost for playing.

When the record has been placed on the turntable 5 with the selected side uppermost for playing it must be released by the jaws 11 and 14 to permit it to rotate with the turntable. The means for effecting such release will now be described.

The slide 48 has a pin 95 thereon (see Figs. 7 and 8) adapted to be engaged by the cam 37 at a predetermined point in the rotation of the shaft 36, and said slide is provided with a laterally extending working end 96 positioned to engage one of the pins 39 on the hub 30 when the transfer head 13 has been rotated from the position shown in Fig. 3 to that shown in Fig. 8 and the hub 30 has been rotated a quarter turn to place the record on the turntable. It will be understood that in the position shown in Fig. 3 the jaws 11 and 14 have engaged a record in vertical position in the magazine 2 and that in the position shown in Fig. 8 the transfer head 13 has been turned substantially 180° on the journals 64, 64' and the hub 30 and arcuate record clamp member 10 have been turned 90° to place the record in horizontal position on the turntable. The cam 37 then engages the pin 95 on the slide 48 and causes the working end 96 of the latter to exert pressure on one of the pins 39 on the hub 30 to move the latter outwardly from the position shown in Fig. 17 to the position shown in Fig. 18. This will move the outer jaw 11 outwardly and the inner jaw 14 inwardly (in the manner previously described) to release the record.

After the positioning of the record on the turntable and the release thereof as just described the tone arm 7 will be moved into playing position (by means not shown) and the clutch (above mentioned) will be moved to its neutral position to permit playing of the record while the transfer mechanism is idle.

When the playing of the record has been completed the clutch mechanism is tripped (by electrical means not shown) and again connects the shaft 36 with the drive shaft for resumption of the operations performed by the rotation of this shaft. After the tone arm is moved from its playing to its idle position the record is gripped by the jaws 11 and 14, this being accomplished by movement of the cam 37 to a position in which the pin 95 and the slide 48 on which it is mounted are moved to the right (viewing Fig. 8) by the spring 45, thus relieving the pressure of the working end 96 of said slide from the pin 39 on the hub 30. The spring 27 (see Figs. 17 and 18) may then move the sleeve 15 and the hub 30 to the right (viewing said Figs. 17 and 18) thereby moving the jaw 11 into record-engaging position and projecting the jaw 14 to such position, the latter movement resulting from the rearward movement of the rack 24 on said sleeve 15, the rotation of the pinion 25 and the forward movement of the rack 22 and plunger 20. The record is now gripped ready to be transferred from the turntable 5 back to the magazine 2.

It will be noted that since delivery of the record to the turntable the cam member 53 has been in the position shown in Fig. 8 and during such rotation of the shaft 36 as has occurred while the intermediate operations above mentioned were being performed the roller 52 on the crank 51 has been riding on the upper arcuate surface 97 in said elliptical cam member 53 without moving the latter from the position of Fig. 8. When return movement of the record clamp member 10 is to take place the roller 52 will have entered the left hand horizontal recess 54' in said cam member (viewing Fig. 8) and further movement of the crank 51 will move said cam member 53 downwardly from the position shown in Fig. 8 to that shown in Fig. 3.

Such downward movement of the member 53 will cause the rack teeth 62 thereon to rotate the pinion 63, thereby turning the transfer head 13 back to its original position (shown in Fig. 3). In the course of such movement the turning pin 66 or 66', which has remained in projected position, will enter the appropriate recess 65 in the hub 30 to rotate said hub from the position in which the record carried by the clamp member 10 is in the horizontal position to the position in which it is disposed vertically for return to the record magazine 2, the locking member 85 having been moved to unlocking position by the cam 94 to permit the quarter turn of the hub 30 necessary for this purpose and then having been automatically returned to the locking position by the torsion spring 92.

Upon return of the record to the appropriate pocket in the magazine 2, the pin 32 on the outer end of the clamp member 10 will enter the V groove in the top of the bracket 33 to properly center the record in its pocket. During the final movement of the shaft 36 the cam 37 on said shaft, acting through the pin 44 and slide 41, will have moved the lever 38 against one of the pins 39 on the hub 30 thereby moving the latter outwardly to cause the release of the record by the jaws 11 and 14 in the manner heretofore described.

After the return of the record to the magazine the clutch above mentioned will be automatically actuated by cam mechanism (not shown) to disconnect the shaft 36 from the source of power and the cycle of operation will thereupon be completed.

During the releasing of the first record after its return to the magazine and the gripping of a new record, in case a further selection has been made, the roller 52 on the crank 51 follows the lower arcuate surface 98 of the elliptical cam member 53 and when it enters the right hand horizontal recess 54 of said member (viewing Fig. 3) it will start upward movement of said member and the new record will be transferred to the turntable by the series of operations above described.

The foregoing detailed description has been given for clearness of understanding only, and no unnecessary limitations should be understood therefrom, but the appended claims should be construed as broadly as permissible in view of the prior art.

I claim:

1. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for moving said hub linearly on the head for causing clamping and unclamping movement of said record-clamping means, means engageable with said hub for turning said clamping means in said head to turn the record from vertical to horizontal or from horizontal to vertical position at predetermined points in the arc of travel thereof, a locking device normally holding said hub positively against turning movement, and means for moving said locking device to unlocking position at the time of each turning movement of said record-clamping means near the opposite ends of said arc of movement of said head and for holding the same in such position during such movement.

2. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for moving said hub linearly on the head for causing clamping and unclamping movement of said record-clamping means, means engageable with said hub for turning said clamping means in said head to turn the record from vertical to horizontal or from horizontal to vertical position at predetermined points in the arc of travel thereof, a locking device normally holding said hub positively against turning movement, means for moving said locking device to unlocking position at the time of each turning movement of said record-clamping means near the opposite ends of said arc of movement of said head and for holding the same in such position during such movement, and means for restoring said device to its locking position as the turning of the record is completed.

3. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for moving said hub linearly on the head for causing clamping and unclamping movement of said record-clamping means, means engageable with said hub for turning said clamping means in said head to turn the record from vertical to horizontal or from horizontal to vertical position at predetermined points in the arc of travel thereof, a locking device normally holding said hub positively against turning movement, means for moving said locking device to unlocking position at the time of each turning movement of said record-clamping means near the opposite ends of said arc of movement of said head and for holding the same in such position during such movement, and means for restoring said device to its locking position as the turning of the record is completed, said locking device comprising a recessed element turnable with said record-clamping means and a locking member biased to engage in a recess of said element when the latter is in position to permit such engagement.

4. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for moving said hub linearly on the head for causing clamping and unclamping movement of said record-clamping means, means engageable with said hub for turning said clamping means in said head to turn the record from vertical to horizontal or from horizontal to vertical position at predetermined points in the arc of travel thereof, a locking device normally holding said hub positively against turning movement, means for moving said locking device to unlocking position at the time of each turning movement of said record-clamping means near the opposite ends of said arc of movement of said head and for holding the same in such position during such movement, and means for restoring said device to its locking position as the turning of the record is completed, said locking device comprising a recessed element turnable with said record-clamping means and a locking member biased to engage in a recess of said element when the latter is in position to permit such engagement and said unlocking means comprising a cam on said frame coacting with said member during rotary movement of said transfer head.

5. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for moving said hub linearly on the head for causing clamping and unclamping movement of said record-clamping means, means engageable with said hub for turning said clamping means in said head to turn the record from vertical to horizontal or from horizontal to vertical position at predetermined points in the arc of travel thereof, a locking device normally holding said hub positively against turning movement, and means for moving said locking device to unlocking position at the time of each turning movement of said record-clamping means near the opposite ends of said arc of movement of said head and for holding the same in such position during such movement, said record-turning means including a member arranged to positively engage and guide said record-clamping means during the time the latter is freed from said locking device.

6. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for moving said hub linearly on the head for causing clamping and unclamping movement of said record-clamping means, means engageable with said hub for turning said clamping means in said head to turn the record from vertical to horizontal or from horizontal to vertical position at predetermined points in the arc of travel thereof, a locking device normally holding said hub positively against turning movement, and means for moving said locking device to unlocking position at the time of each turning movement of said record-clamping means near the opposite ends of said arc of movement of said head and for holding the same in such position during such movement, said record-turning means including a member arranged to positively engage and guide said record-clamping means during the time the latter is freed from said locking device and said locking device including a recessed element turnable with said record-clamping means and a locking member having a projection thereon for engagement in a recess of said element when the latter is in position to permit such engagement, said projection and recess being of wedge-shape whereby the projection may be gradually engaged in and disengaged from the recess as said turning member is disengaging or engaging said record-turning means.

7. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means independent of said last-mentioned means and of the movement of said transfer head for moving said hub linearly on the head to cause clamping and unclamping movement of said record-clamping means, means engageable with said hub for turning said clamping means in said head to turn the record from vertical to horizontal or from horizontal to vertical position at predetermined points in the arc of travel thereof, a locking device normally holding said hub positively against turning movement, and means for moving said locking device to unlocking position at the time of each turning movement of said record-clamping means near the opposite ends of said arc of movement of said head and for holding the same in such position during such movement.

8. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, means for rotating said head, and means for actuating said record-clamping means to cause clamping and unclamping movement thereof at the magazine and the turntable, said record-clamping means including jaws engageable with the records at opposite edges thereof and said actuating means causing said jaws to move equally in opposite directions in said clamping and unclamping movement whereby the position of the center of the records in relation to the clamping jaws remains undisturbed during such movement, said actuating means including a slidably mounted member carrying one of said jaws, a lever independent of said head and engageable with said member to move the same when the jaw carried thereby is adjacent the magazine, a second lever independent of said head and engageable with said member to move the same when said jaw thereon is adjacent the turntable, and means operated by said member in the movement thereof in one direction to move the other jaw in the opposite direction.

9. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, means for rotating said head, and means for actuating said record-clamping means to cause clamping and unclamping movement thereof at the magazine and the turntable, said record-clamping means including jaws yieldingly engageable with the records at opposite edges thereof and said actuating means causing said jaws to move equally in opposite directions in said clamping and unclamping movement, with a range of movement sufficient to enable them to engage records of different diameters, whereby the position of the center of the records in relation to the clamping jaws remains undisturbed during such movement and said jaws are caused to engage the record irrespective of variation in the diameters thereof, said actuating means including a slidably mounted member carrying one of said jaws, a lever independent of said head and engageable with said member to move the same when the jaw carried thereby is adjacent the magazine, a second lever independent of said head and engageable with said member to move the same when said jaw thereon is adjacent the turntable, and means operated by said member in the movement thereof in one direction to move the other jaw in the opposite direction.

10. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for actuating said record-clamping means to cause clamping and unclamping movement thereof at the magazine and the turntable, said record-clamping means including jaws engageable with the records at opposite edges thereof and said actuating means causing said jaws to move equally in opposite directions in said clamping and unclamping movement whereby the position of the center of the records in relation to the clamping jaws remains undisturbed during such movement, said actuating means including said slidably mounted hub member, the latter carrying one of said jaws, and means mounted in said head and operable by said hub member whereby movement thereof in one direction causes movement of the other jaw in the opposite direction.

11. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto, means for rotating said head, means for actuating said record-clamping means to cause clamping and unclamping movement thereof at the magazine and the turntable, said record-clamping means including jaws engageable with the records at opposite edges thereof and said actuating means causing said jaws to move equally in opposite directions in said clamping and unclamping movement whereby the position of the center of the records in relation to the clamping jaws remains undisturbed during such movement, said actuating means including said slidably mounted hub member, the latter carrying one of said jaws, a member carrying the other of said jaws and having relative sliding movement with respect to said hub member, means for moving said hub member in one direction, and means mounted in said head and comprising a reverse-drive connection between said members whereby such movement causes movement of the second member in the opposite direction.

12. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto means for rotating said head, means for actuating said record-clamping means to cause clamping and unclamping movement thereof at the magazine and the turntable, said record-clamping means including jaws engageable with the records at opposite edges thereof and said actuating means causing said jaws to move equally in opposite directions in said clamping and unclamping movement whereby the position of the center of the records in relation to the clamping jaws remains undisturbed during such movement, said actuating means including said slidably mounted hub member, the latter carrying one of said jaws, a member carrying the other of said jaws and having relative sliding movement with respect to said hub member, a reverse-drive connection between said members, means for moving said hub member in one direction, and means for thereafter causing reverse movement of said second member and, through said connection, also said hub member to cause reverse action of said jaws, said reverse drive connection being disposed within said head.

13. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, including a hub mounted on the head for both rotary and linear motion with respect thereto means for rotating said head, means for actuating said record-clamping means to cause clamping and unclamping movement thereof at the magazine and the turntable, said record-clamping means including jaws engageable with the records at opposite edges thereof and said actuating means causing said jaws to move equally in opposite directions in said clamping and unclamping movement whereby the position of the center of the records in relation to the clamping jaws remains undisturbed during such movement, said actuating means including said slidably mounted hub member, the latter carrying one of said jaws, a member carrying the other of said jaws and having relative sliding movement with respect to said hub member, a reverse-drive connection between said members, means for moving said hub member in one direction, and means for thereafter causing reverse movement of said second member and, through said connection, also said hub member to cause reverse action of said jaws, said last-mentioned means comprising a spring arranged to urge said second member in direction to cause such reverse action and the means for moving said hub member in the direction first mentioned acting against the tension of said spring, said reverse drive connection and said spring being disposed within said head.

14. In an automatic phonograph having a magazine for holding a plurality of records in vertical position and a turntable on which the records are placed in horizontal position for playing: a record-changing mechanism comprising a frame, a transfer head journaled for rotary movement on said frame, record-clamping means carried by said head and movable by the latter through an arc between the magazine and the turntable, means for rotating said head, means for causing clamping and unclamping movement of said record-clamping means, means for turning said clamping means in said head to turn the record from vertical to horizontal during the travel thereof from the magazine to the turntable including a hub forming a part of said record-clamping means, said hub being located at the forward, record-clamping end of said head and having elongated recesses in the periphery thereof, sleeves mounted on opposite sides of said head in a predetermined position thereof and slidably mounted pivot members in said sleeves selectively movable horizontally at right angles to the direction of movement of said record-clamping means into position to enter a recess in said hub at a predetermined point in the path of travel of said clamping means to cause turning movement of the latter, magazine shifting mechanism, and means controlled by said shifting mechanism for moving one or the other of said pivot members to operative position prior to a record transfer operation depending upon the position of the magazine at the time of such operation, the record being turned to one side or the other depending on which of said members is in operative position.

15. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, means for rotating said head, and means for actuating said record-clamping means to cause clamping and unclamping movement thereof at the magazine and the turntable, said head-rotating means including a crank shaft, a crank having a cam follower thereon, devices actuated by said crank for turning said head in forward and reverse directions, and a cam of generally elliptical form having working portions at each end thereof for receiving said follower to effect forward and reverse movements, respectively, of said head with uniform velocity and idle portions over which said follower may pass during intervals between movements of said head.

16. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, means for rotating said head, and means for actuating said record-clamping means to cause clamping and unclamping movement thereof at the magazine and the turntable, said head-rotating means including a crank shaft, a crank having a cam follower thereon, devices actuated by said crank for turning said head in forward and reverse directions, and a cam formed with internal faces having working portions at each end thereof for receiving said follower to effect forward and reverse movements, respectively, of said head with uniform velocity and idle portions over which said follower may pass during intervals between movements of said head.

17. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, means for rotating said head, and means for actuating said record-clamping means to cause clamping and unclamping movement thereof at the magazine and the turntable, said head-rotating means including a crank shaft, a crank having a cam follower thereon, devices actuated by said crank for turning said head in forward and reverse directions, and a cam having working portions at each end thereof for receiving said follower to effect forward and reverse movements, respectively, of said head with uniform velocity and idle portions over which said follower may pass during intervals between movements of said head, said devices including a rack-and-pinion driving connection between said cam and said head.

18. In an automatic phonograph having a magazine for holding a plurality of records and a turntable on which the records are placed for playing: a record-changing mechanism comprising a frame, a transfer head journaled for rotary movement on said frame, record-clamping means carried by said head and movable by the latter through an arc between the magazine and the turntable, means for rotating said head, and means for actuating said record-clamping means to cause clamping and unclamping movement thereof at the magazine and the turntable, said record-clamping means including jaws engageable with the records at opposite edges thereof and said actuating means causing said jaws to move equally in opposite directions in said clamping and unclamping movement whereby the position of the center of the records in relation to the clamping jaws remains undisturbed during such movement, said actuating means including a slidably mounted hub member carrying one of said jaws, said hub member having both rotary and linear movement with respect to said head means engageable with said member to move the same when the jaw carried thereby is adjacent the magazine, means engageable with said member to move the same when said jaw thereon is adjacent the turntable, and means operated by said member in the movement thereof in one direction to move the other jaw in the opposite direction.

LLOYD J. ANDRES.

REFERENCES CITED

The following references are of record in the file of this patent:

UNITED STATES PATENTS

| Number | Name | Date |
|---|---|---|
| Re. 21,514 | Green | July 23, 1940 |
| 1,741,040 | Seal et al. | Dec. 24, 1929 |
| 1,800,645 | Kissinger | Apr. 14, 1931 |
| 1,902,158 | Brump et al. | Mar. 21, 1933 |
| 2,003,424 | Brandstrom | Feb. 1, 1935 |
| 2,064,868 | Yeider | Dec. 22, 1936 |
| 2,169,854 | Stephenson | Aug. 15, 1939 |
| 2,545,361 | Kasnowich | Mar. 13, 1951 |